United States Patent [19]
Zancho et al.

[11] Patent Number: 5,633,484
[45] Date of Patent: May 27, 1997

[54] METHOD AND APPARATUS FOR PERSONAL ATTRIBUTE SELECTION AND MANAGEMENT USING A PREFERENCE MEMORY

[75] Inventors: William F. Zancho, Hawthorn Woods; David B. Spitulnik, Evanston, both of Ill.

[73] Assignee: Motorola, Inc., Schaumburg, Ill.

[21] Appl. No.: 366,209

[22] Filed: Dec. 29, 1994

[51] Int. Cl.[6] .................................................. G06K 5/00
[52] U.S. Cl. .............................................................. 235/380
[58] Field of Search ..................................... 235/380, 375; 379/58, 62

[56] References Cited

U.S. PATENT DOCUMENTS

| | | | |
|---|---|---|---|
| 4,213,009 | 7/1980 | Suzuki | 179/2 |
| 4,451,887 | 5/1984 | Harada et al. | 364/424 |
| 4,477,874 | 10/1984 | Ikuta et al. | 364/424 |
| 4,754,255 | 6/1988 | Sanders et al. | 340/64 |
| 4,771,399 | 9/1988 | Snowden et al. | 364/900 |
| 4,792,986 | 12/1988 | Garner et al. | 455/89 |
| 4,899,373 | 2/1990 | Lee et al. | 379/207 |
| 4,935,870 | 6/1990 | Burk, Jr. et al. | 364/200 |
| 4,965,821 | 10/1990 | Bishop et al. | 379/91 |
| 5,029,233 | 7/1991 | Metroka | 455/11 |
| 5,081,707 | 1/1992 | Schorman et al. | 455/186.1 |
| 5,084,821 | 1/1992 | Ohsuga et al. | 364/424.05 |
| 5,128,981 | 7/1992 | Tsukamoto et al. | 379/58 |
| 5,134,717 | 7/1992 | Rasmussen | 455/89 |
| 5,156,203 | 10/1992 | Funakoshi et al. | 165/12 |
| 5,179,517 | 1/1993 | Sarbin et al. | 364/410 |
| 5,193,114 | 3/1993 | Moseley | 380/23 |
| 5,204,663 | 4/1993 | Lee | 340/825.34 |
| 5,266,782 | 11/1993 | Alanara et al. | 235/380 |
| 5,283,887 | 2/1994 | Zachery | 395/500 |
| 5,287,514 | 2/1994 | Gram | 395/700 |
| 5,297,189 | 3/1994 | Chabernaud | 379/58 |
| 5,300,974 | 4/1994 | Stephenson, III | 354/75 |
| 5,327,529 | 7/1994 | Fults et al. | 395/155 |
| 5,359,182 | 10/1994 | Schilling | 235/380 |
| 5,404,580 | 4/1995 | Simpson et al. | 455/89 |
| 5,410,344 | 4/1995 | Graves et al. | 348/1 |
| 5,479,476 | 12/1995 | Finke-Anlauff | 379/58 |

FOREIGN PATENT DOCUMENTS

| | | |
|---|---|---|
| 0169726 | 1/1986 | European Pat. Off. . |
| 0 217 351 A2 | 4/1987 | European Pat. Off. . |
| 0 284 921 A2 | 10/1988 | European Pat. Off. . |
| 0378775 | 7/1990 | European Pat. Off. . |
| 0 396 834 A1 | 11/1990 | European Pat. Off. . |
| 3838677 | 5/1990 | Germany . |
| 4-86034A | 3/1992 | Japan . |
| 2241133 | 8/1991 | United Kingdom . |
| 2251357 | 7/1992 | United Kingdom . |
| 2 256 734 A | 12/1992 | United Kingdom . |
| 2 256 734 | 12/1992 | United Kingdom . |
| 2 269 032 A | 1/1994 | United Kingdom . |
| 2270442 | 3/1994 | United Kingdom . |
| WO91/02313 | 2/1991 | WIPO . |
| WO9219078 | 10/1992 | WIPO . |

Primary Examiner—Donald T. Hajec
Assistant Examiner—Mark Tremblay
Attorney, Agent, or Firm—Daniel W. Juffernbruch

[57] ABSTRACT

An application device (401) is connectable with a donor device (541) such as a portable memory card (560) or widely accessible central database (550). The donor device (541) stores and provides preferences to the application device (401). The donor device (541) contains a reference preference memory capable of storing preferences for a particular user. A controller (450) accesses the donor device to obtain preferences that pertain to the particular user under certain conditions and stores preferences obtained from the donor device in the session preference memory (490) of the application device (401) for use in a session by the particular user.

44 Claims, 11 Drawing Sheets

APPLICATION DEVICE MEMORY

| | |
|---|---|
| DEVICE OPERATING SYSTEM SOFTWARE | 610 |
| APPLICATION SOFTWARE | 620 |
| PERSONNEL ATTRIBUTE SELECTION SOFTWARE | 630 |
| INPUT/OUTPUT SOFTWARE | 640 |
| SESSION PREFERENCE MEMORY | 650 |

FIG. 10

DONOR DEVICE MEMORY

| | |
|---|---|
| PERSONNEL ATTRIBUTE SELECTION SOFTWARE | 710 |
| REFERENCE PREFERENCE MEMORY | 720 |

METHOD AND APPARATUS FOR PERSONAL ATTRIBUTE SELECTION AND MANAGEMENT USING A PREFERENCE MEMORY

BACKGROUND OF THE INVENTION

1. Field of the Invention

The present invention relates to an attribute system and, more particularly, relates to devices and associated methods for selecting and managing personal attributes.

2. Description of the Related Art

A human interfaces with many devices throughout his life. Some require him to deal with the device in many different situations. An individual tends to be more friendly and efficient if the way he interfaces with the devices and tools that he encounters in his daily life in different situations are friendly and familiar to him.

Some cellular telephones are capable of receiving a subscriber identification module (SIM) or a SIM card which contains user identification and accounting information as well as authorization to network features and functionality. In addition, the subscriber identification module can contain a list of frequently used telephone numbers. However, their list of frequently used telephone numbers does not promote the most friendly and efficient interface to a cellular telephone. A subscriber interface or system for providing the most friendly and efficient interface for an individual and a device such as a cellular telephone is needed.

Some models of automobiles allow the storage of seat and mirror position preferences for a limited number of particular drivers. This information is programmed and stored within the vehicle. The seat and mirror position preferences are activated by the driver identifying himself, such as by the key a particular user uses to unlock a vehicle. The seat and mirror position preferences reside in the vehicle because they are programmed into a memory in the vehicle. Thus, when the driver enters another programmable vehicle, such as a rental car, the driver must reestablish his position preferences.

Some time-share computers allow each individual user to store his screen characteristics in a centralized memory so that the user can access this familiar interface on any terminal interfaced to the computer. When the user logs on to a similar but non-interconnected time-sharing computer system he must use the default setup or reprogram his preferred screen characteristics.

These examples of user preference programming require that the user reprogram new models of equipment encountered by the user. For example, when a user encounters a public telephone in a taxicab or an airplane or when a user purchases a new communication device, the most friendly and efficient interface cannot be easily obtained and established for that individual on that device at that instant. No mechanism exists to establish and manage preferences compatible with all new models of various types of telephone, automobile, computer or other type of conformable equipment.

DETAILED DESCRIPTION OF THE PREFERRED EMBODIMENTS

The foregoing and other problems can be solved by the personal attribute selection and management system of the present invention. A user of multiple application devices can keep the user's preferences in a convenient location for use by the multiple application devices. Such preferences can be stored and accessed by multiple devices in a number of ways in both time and space. A non-application device such as a portable memory card or widely accessible central database can serve as a donor device to store and provide preferences to application devices. Application devices containing the donor device function can also serve as a donor device and communicate with other application devices. Real time access can be provided through a network to a user's reference preference set in a reference preference memory located in any convenient application or donor device. Preferences can thus be conveniently established for users who encounter a new model of conformable equipment through a seamless or ubiquitous interface to a device.

Figure 1:
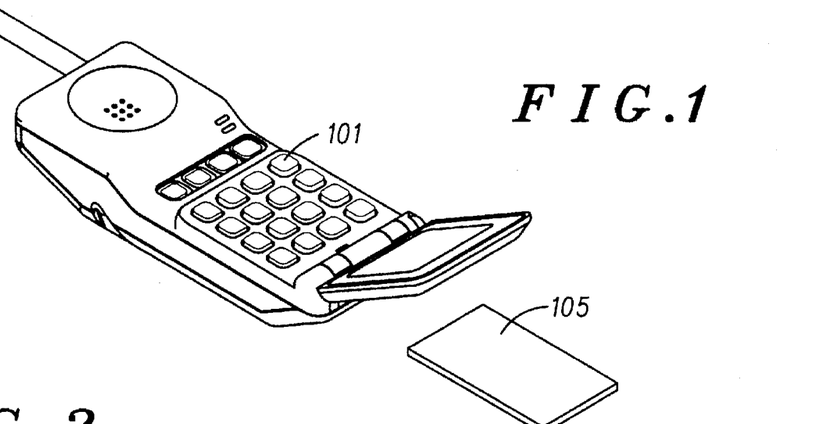
FIGS. 1–5 illustrate various application devices capable of accepting a portable donor device according to embodiments of the present invention.
Figure 2:
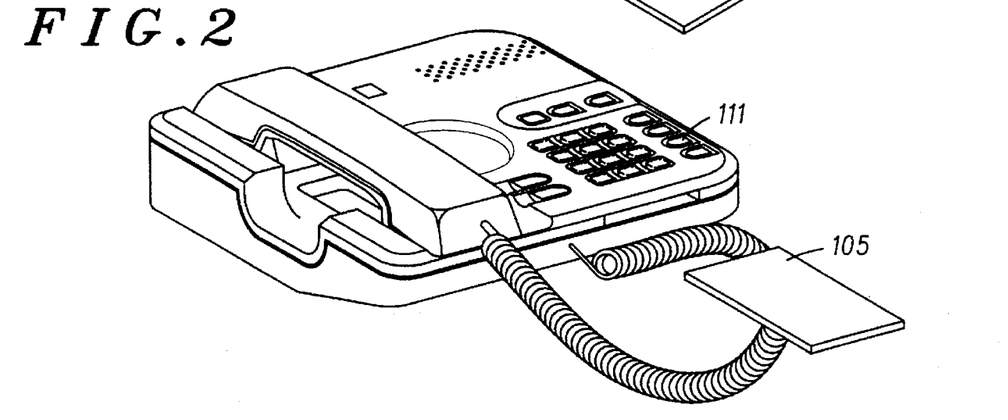
Figure 3:
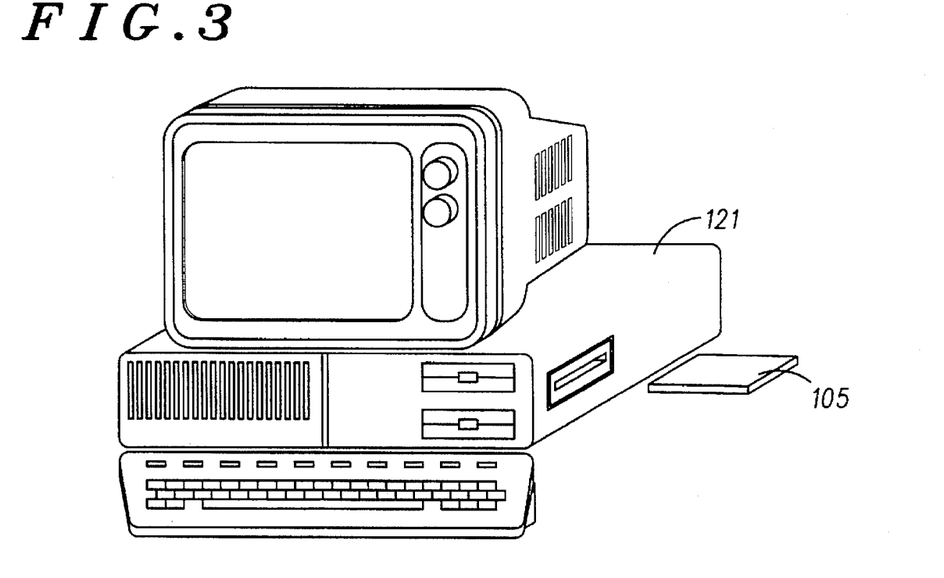
Figure 4:
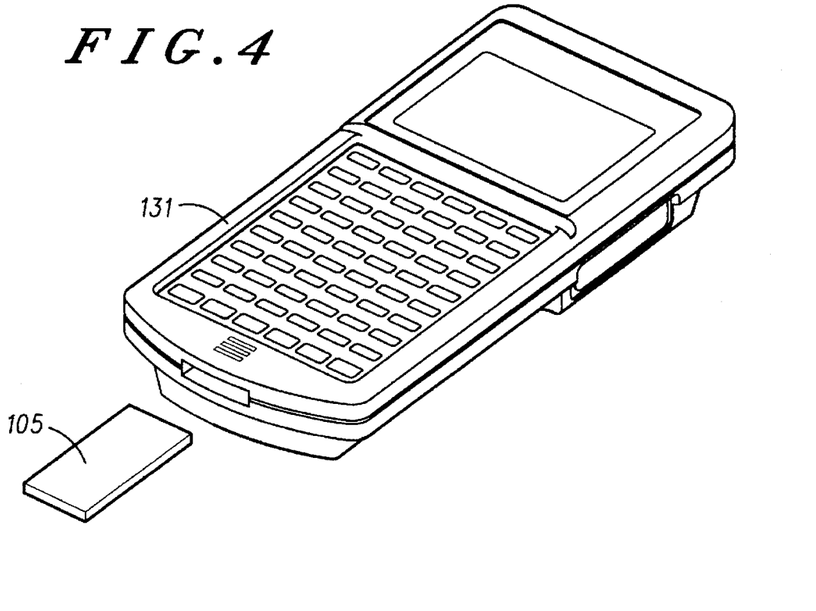
Figure 5:
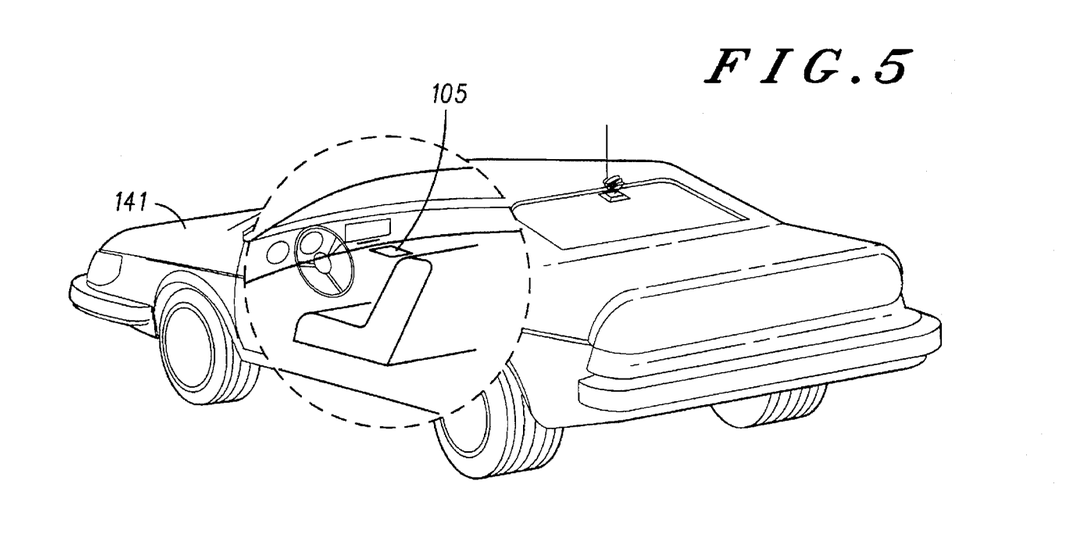

FIG. 1 illustrates an application device such as a cellular telephone 101 capable of accepting a portable donor device 105 such as a smart card or memory card. FIG. 2 illustrates an application device such as desk phone 111 capable of accepting a portable donor device 105, and FIGS. 3–5 illustrate application devices such as a personal computer 121, a personal organizer 131, and a dashboard 141 of an automobile capable of accepting a portable donor device 105.

The portable donor device 105 contains a single user's preferences to be used with any one of these appropriately equipped application devices. When the donor device 105 is inserted and interoperates with an appropriately equipped application device, preferences established through sessions with this application device or other application devices, similar in nature, are used to define the attributes for this application device.

Through this mechanism, the user needs only to establish his interface preferences once. Those preferences for attributes which are common to multiple application devices are automatically reusable. Those preferences for attributes which are similar but not in common to other application devices can be used to either predict or propose preferences for those other application devices.

The cellular telephone 101, desk phone 111, personal computer 121, personal organizer 131, and dashboard 141, have certain attributes common to all these devices. Preferences for an individual user corresponding to these attributes can be stored on the user's memory card or portable donor device 105. For example, the user's display preferences common to all these devices can be stored on the user's memory card or portable donor device 105. Assuming the user has a particular font preference for a display attribute, this font preference can be easily accessed by each application device that accepts the user's card or portable donor device 105. Preferences for other display or visual attributes such as contrast, brightness, background pattern, color, icon type, icon location and choice of digital or analog gauges, for example, can also be handled through this mechanism. Besides display preferences, other types of preferences such as audible, circumstantial/spatial, taste and smell can be accessed by this mechanism to set the attributes of a particular application device.

Application devices 101, 111, 121, 131, and 141 all contain software which allows interoperation with the portable donor device 105. Portable donor device 105 contains control software which manages the interoperation with the application devices and manages the organization of the reference preference memory contents.

Figure 6:
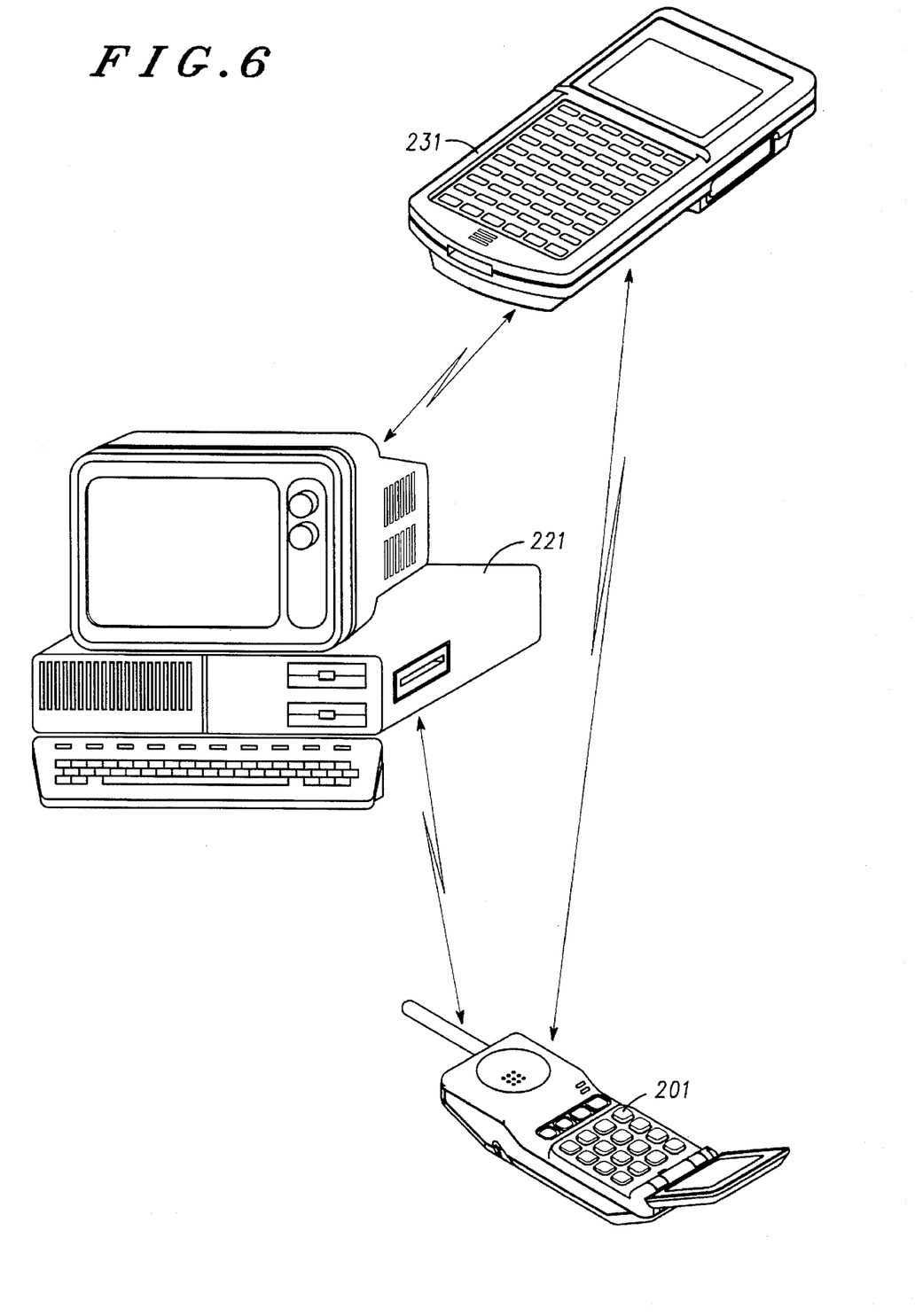
FIG. 6 illustrates communication between application devices to share preferences therebetween according to other embodiments of the present invention.

FIG. 6 illustrates a cellular telephone 201, a personal organizer 231 and a personal computer 221 capable of sharing a user's reference preference set over interconnections therebetween. These and other application devices can obtain the user's reference preference set from another device acting as a donor device for the user's preferences. The user's reference preference set can be accessed via several types of interconnections such as an infrared (IR) connection, a radio frequency (RF) connection or a cable connected therebetween.

In the embodiment of FIG. 6, the devices require physical co-location where one of the devices contains the user's reference preference set in a reference preference memory. Communication between the devices can be established by a radio frequency (RF) or optical link such as infrared (IR) light. The device containing the user's reference preference set is preferably designated as the donor device to transmit preferences to other application devices. An application device can thus act as both an application device and a donor device at the same time, thus becoming what is called an attached donor device. When preferences are established by the user of a donor device (such as the personal organizer 231), their accessibility by another application device (such as the cellular telephone 201) is deferred until the application device (such as the cellular telephone 201) is in close physical proximity or co-located with the donor device (such as the personal organizer 231).

In an embodiment where multiple application devices act as an attached donor device and each contain a reference preference set for the same individual user, multiple copies of the reference preference set will sometimes conflict with one another. Eventually these attached donor devices will become co-located or connected on a network with one another or with the actual donor device. When an attached donor device becomes co-located or connected on a network, the reference preference set can be reconciled by exchanging and storing the most recent preference entries identified, for example, by time stamps. In order to prevent contamination by overwriting old preferences, the user can be queried beforehand.

In an alternative embodiment, session preferences can be temporarily stored in the application device's session preference memory and shared with other co-located application devices until a given time when the device containing the reference preference memory is re-united with these application devices, upon which time the most recent preferences are then offered to the reference preference set as up-dates. In order to prevent contamination by overwriting old preferences, the user can also be queried beforehand.

Figure 7:
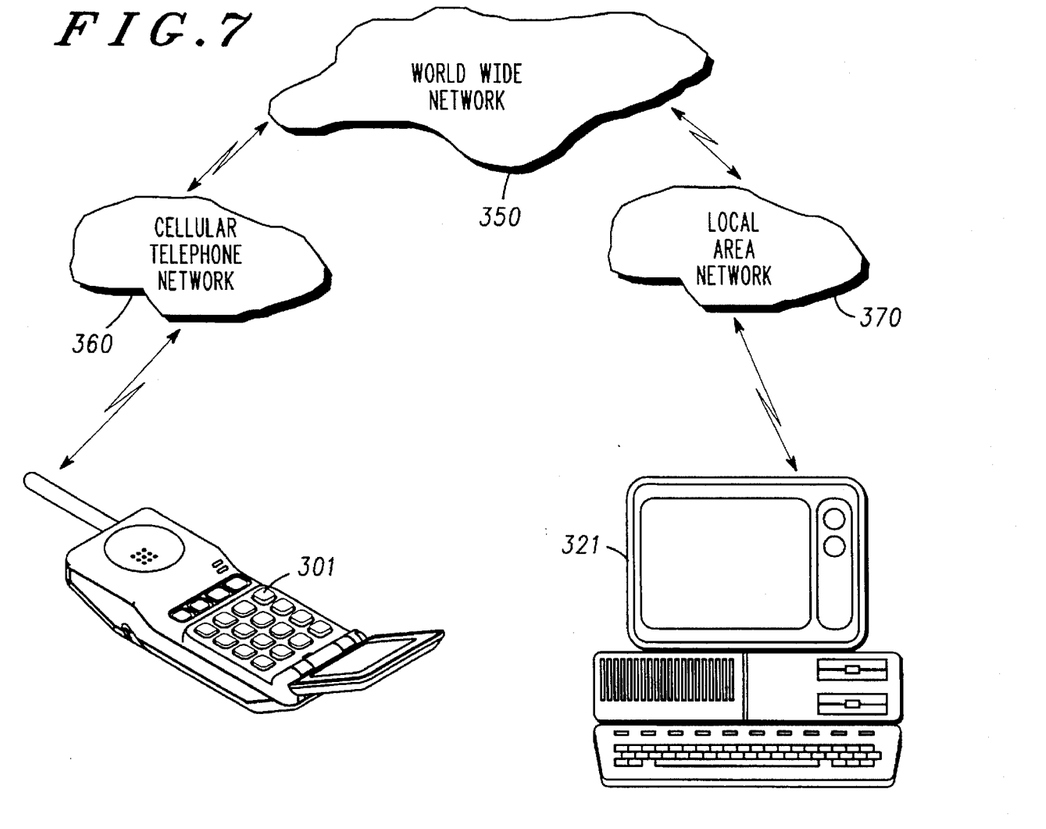
FIG. 7 illustrates communication between application devices over a network according to a further embodiment of the present invention.

FIG. 7 illustrates a further embodiment of the personal attribute selection and management system according to the present invention. A plurality of application devices such as a cellular telephone 301 and a personal computer 321 can establish preferences for a new application of a particular user in an application device by communication over a worldwide network 350. For example, the cellular telephone 301 can access a user's reference preference set over the worldwide network 350 stored in a reference preference memory of the personal computer 321. The personal computer 321 can then be chosen to store the user's reference preference set based on convenience to the user's lifestyle and location of existing tools. For example, instead of a personal computer 321, the user could subscribe to a network service that stores the user's reference preference set in a reference preference memory of the worldwide network 350. Such network service could store user reference preference sets on a file server connected to the worldwide network 350. Alternatively, the user could choose to store the reference preference set in another tool such as his mobile automobile computer accessible to the worldwide network 350 via a wireless data interconnect compatible to the Intelligent Vehicle Highway System (IVHS). Furthermore, a cellular telephone 301 can contain the user's reference preference set stored in a reference preference memory of the cellular telephone 301 and accessible through the worldwide network 350. The worldwide network 350 could connect to various local networks such as a cellular phone network 360 or a computer's local area network 370. The user's reference preference set can be communicated, for example, from a reference preference memory of the cellular telephone 301 over existing or future cellular phone networks 360. For example, the user's reference preference set can be transmitted over a cellular digital packet data (CDPD) or short message service on an existing analog advanced mobile phone (AMPS) service. The user's reference preference set can also be transmitted in a data format of the Global System for Mobile communications (GSM) system or a time division multiple access (TDMA) or code division multiple access (CDMA) system.

The embodiment of FIG. 7 provides the most flexible and convenient implementation of the present invention because a user can obtain instant real-time access to the user's reference preference set without the necessity of carrying a card or physically connecting devices as previously required. The worldwide network 350 preferably is provided by a worldwide information super highway or national information super highway if a worldwide network is not yet available. A worldwide satellite network or cellular telephone or data network can also be used for the network 350. Additionally, communication of a user's reference preferences from the user's reference preference set for a particular application can be communicated between devices connected to one sub-network such as a local area network or cellular radiotelephone network. Thus, if a donor device and application device were connected, for example, in an office building to the same local area network, a preference set up could be performed in real-time without accessing an outside network such as the worldwide network 350.

Figure 8:
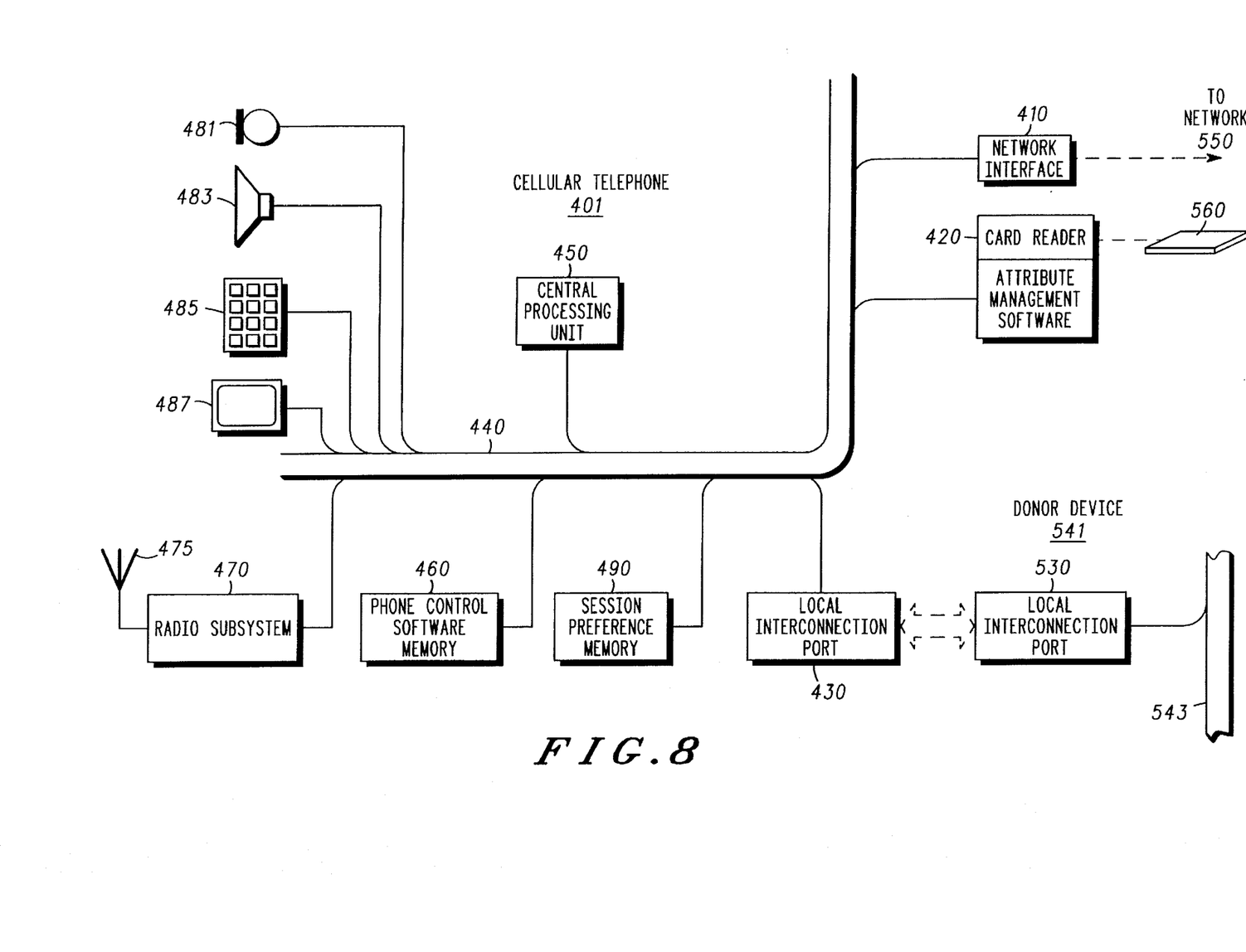
FIG. 8 illustrates an exemplary embodiment of an application device having multiple connectivity options according to the present invention.

FIG. 8 illustrates an example of an application device having multiple connectivity options. The multiple connectivity options are provided by a network interface 410, a card reader 420 or a local interconnection port 430. In the example of FIG. 8, the application device is a cellular telephone 401 connectable to a donor device by any one of the multiple connectivity options. The cellular telephone 401 can be built with any one of, or all three of, the exemplary connectivity options.

Connection of the cellular telephone 401 to a worldwide network 550 can be achieved by the network interface 410. The network interface 410 can connect to the network 550 via a RJ11 telephone network connector, via an ethernet connection, via an optical connection or a radio frequency (RF) connection such as a radio frequency local area network or cellular data network.

Connection of the cellular telephone 401 to a donor card 560 can be achieved by the card reader 420. The donor card 560 can provide merely a memory to be read by the card reader 420 or can contain a processor and memory management unit (MMU) of an application specific integrated circuit (ASIC), and can also be a smart card.

Connection of the cellular telephone 401 to a local interconnection such as that illustrated in FIG. 6 can be achieved by the local interconnection port 430. The local interconnection port 430 can connect to a local interconnection port of a donor device 541 via an infrared (IR) connection, a direct connect cable connection or a radio frequency (RF) connection.

The donor device 541 has a local interconnection port 530 for connection to the local interconnection port 430 of the cellular telephone 401. The donor device 541 has an internal bus 543 for connection to other internal components of the device. The donor device 541 can be connected to the cellular telephone 401 in other ways besides through the local interconnection port 430. Instead, the network 550 can connect the donor device 541 to the cellular telephone 401.

The cellular telephone 401 of FIG. 8 preferably has an internal bus 440 for connection of the internal components of the cellular telephone 401 to the interface devices 410, 420 and 430. The internal bus 440 also connects the internal components of the cellular telephone 401 to one another under control of a central processing unit 450 (CPU). A radiotelephone control software memory 460 connects to the internal bus 440 and provides control of the functionality of the cellular telephone 401. A radio subsystem 470 connects to an antenna 475 via a transmitter and receiver. The radio subsystem 470 is operated according to standard cellular telephone air interface specifications under control of the radiotelephone control software memory 460. Input and output devices such as a microphone 481, a speaker 483, a keyboard 485 and a display 487 connect to and are operated over the internal bus 440 of the cellular telephone 401. These input and output devices provide user interface devices.

A session preference memory 490 stores session preferences of a particular user of the application device of this cellular telephone 401. The session preference memory 490 is accessible to the cellular telephone 401 via the internal bus 440 and is also accessible to the reference preference set interface devices 410, 420 and 430 via the internal bus 440. Upon an initial session set-up, the attribute management software within the interface devices 410, 420 or 430 obtains the appropriate preferences from the reference preference set for necessary attributes. The appropriate preferences are stored in the session preference memory 490 based on a dialog with the radiotelephone control software 460 which knows the necessary attributes for the cellular radiotelephone in order to properly operate the input and output devices. Once all or some of the necessary attributes have been assigned preferences for a cellular radiotelephone by storage, the attribute management software is no longer active in operation of the cellular radiotelephone. The radiotelephone control software then takes over the operation of the input and output devices 481, 483, 485 and 487 in accordance with the session preferences that have been established and loaded into memory 490.

Figure 9:
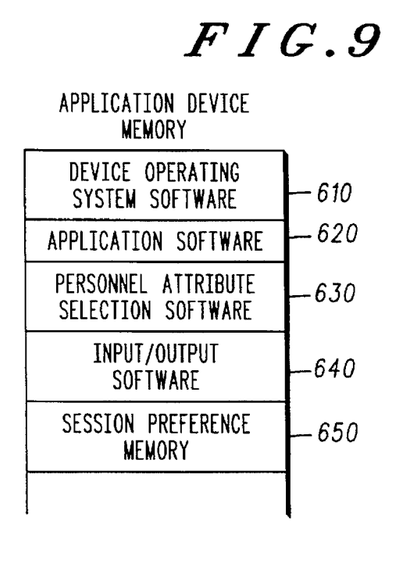
FIG. 9 illustrates a memory within a exemplary application device according to the present invention.

FIG. 9 illustrates a memory within an exemplary application device in a personal attribute selection management system according to the present invention. The device operating system 610 manages the resources within the application device. Peripheral to the device operating system 610 is the application software 620 and the personal attribute selection (PAS) software 630. The input/output control software 640 interacts with the personal attribute selection software to determine the preferences required for this application. These preferences are stored in the session preference memory 650 which are acquired through the interchange with the user's reference preference set of preferences in the donor device.

Figure 10:
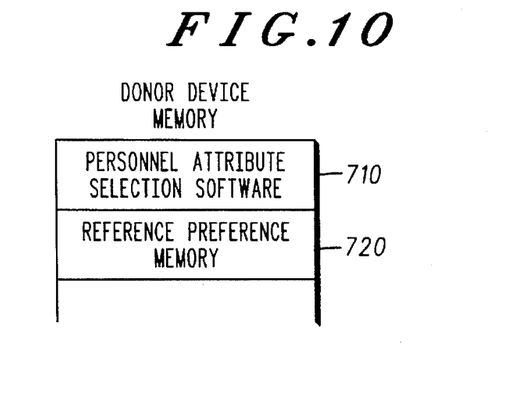
FIG. 10 illustrates a memory within a exemplary donor device according to the present invention.

FIG. 10 illustrates the memory of within an exemplary donor device partitioned into personal attribute selection (PAS) software 710 and a reference preference memory 720. The personal attribute selection software 710 is the management software that organizes the reference preference memory 720 and interfaces with the application device to determine which portions and which information should be provided for from the reference preference memory 720 for a particular session.

Figure 11:
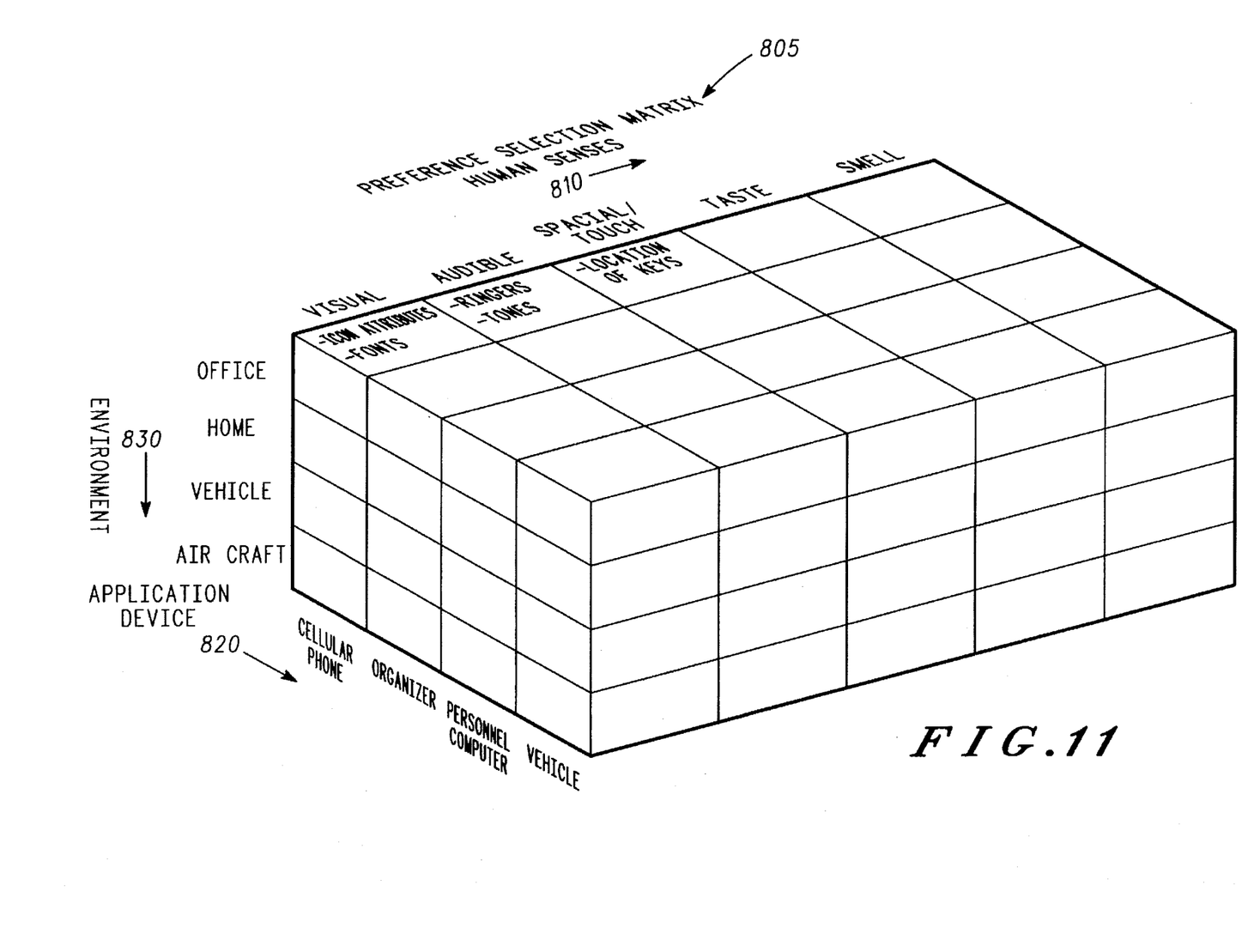
FIG. 11 illustrates an embodiment of a data structure for a reference preference memory according to the present invention.

FIG. 11 illustrates an example of a data structure of a particular user's reference preference set stored in attribute cells of the reference preference memory of a donor device. Each user's reference preference set can be stored as a multi-dimensional reference selection matrix 805 as illustrated by the exemplary three-dimensional matrix of FIG. 11. The three-dimensional reference selection matrix of FIG. 11 is structured along three axes of access: a human senses axis 810 of access, an application device axis 820 of access, and an environment axis 830 of access.

The human senses axis 810 of access is classified by various types of user interface modes such as visual, audible, circumstantial/spatial, taste and smell, for example. These categories correspond essentially to the biological senses of a human user. The five illustrated categories are by example only and various categories and subcategories of attributes can be used depending on the level of preference sensitivity desired by the system or by a particular user of the system. Should the reference preference memory be configured for access thereto by a specific application, such as word processing or calendar software, the human senses axis 810 can be used as an application axis of access. In such an instance, the available attributes for the application would instead correspond to the categories along the axis 810.

Particular user preferences for each of the types of attributes are stored in an attribute cell located at the intersection of the matrix's different axes of access. For example, attribute cells associated with visual attributes are stored with preferences such as font types, font sizes, menu order preferences, menu size preferences, window size preferences, locations of icons, patterns, colors, font sizes and preference for analog or digital gauges or display graphs. Further, attribute cells associated with the audible attributes can contain types of prompts such as key feedback prompts, e-mail audible feedback prompts, bad move error prompts or change done prompts, negative indication preferences, speech and language recognition preferences, ringing such as urgent ringing, normal ringing, data ringing, volume preferences, tone type preferences, or commercial broadcast station selection preferences, base and treble control as well as fade and balance preferences. The attribute cells associated with the circumstantial or spatial attributes can contain temperature preferences, humidity preferences, percentage of outside (fresh) air preferences, air conditioning balance preferences, car seat position preferences, automobile mirror position preferences, and seat heater temperature preferences.

The application device axis 820 of access to the reference selection matrix 805 defines particular types of application devices such as cellular telephones, personal computers, personal organizers or vehicles. Further, one type of application device can be a subset of application devices, such as different types of full or minimum function cellular telephones or such as different types of cellular telephones manufactured by different manufacturers.

The environment axis 830 of access is a third dimension to the reference selection matrix 805 which provides improved accuracy in the access of preferences from the matrix beyond that provided by the attributes and application device axes of access. The environment axis 830 is helpful in obtaining the most accurate selection. More than three axes can be used besides the three axes 810, 820 and 830. Alternatively, the environment axis 830 can be omitted in a simpler implementation of the reference selection matrix 805. The attribute cells associated with the environment axis 830 of access to the reference selection matrix 805 can include an office environment, a home environment or a vehicle environment, such as aircraft, automobile, etc.

The environmental conditions along the environment axis 830 are different from the devices along the application device axis 820 or the human senses along the human senses axis 810 because they depend on circumstantial conditions such as ambient background noise, darkness or brightness of ambient lighting conditions, or other characteristics in a particular environment which require certain combinations of preferences to avoid interrupting or to aid individuals in the environment. For example, the environment is important in a heating and air conditioning system where an individual's environment dictates desired temperature and humidity preferences. The environment axis 820 can be used, for example, to obtain different preferences should a user desire colder temperatures at an office than at home. In such an example, a meeting at the office could be designated a sub-environment category which would require a preference for a non-audible ringing of a cellular telephone using a vibrator. However, in the office when the user is not at a meeting, a sub-environment for the office could then elect an audible ringing for a cellular telephone.

The reference selection matrix 805 is preferably accessed along the multiple axes based on a preference selection vector received from an application device. The preference selection vector contains at least two or more selection criteria such as the needed human senses types, the needed environment or circumstance and the actual application or application device type. Preferences can thus be established by accessing a reference preference memory using multiple criterion such as a needed human sense among a plurality of stored human sense preferences under a particular circumstance, for example, such as in an airplane or in the conference room of the office. Such a reference preference memory has heretofore been impossible. By accessing such memory using the reference preference vector, preferences can be set-up for multiple types of situations without encumbering the user with a myriad of different set-up procedures and choices.

Preferences stored in an attribute cell of the reference selection matrix 805 can be accessed directly based on the intersection of the indices of the axes. For example, an application device of a cellular telephone in the environment of an office can have visual attributes such as font size selected from the preferences stored in the at/tribute cell intersecting therewith. However, when the donor device is unavailable or when inadequate preferences are stored in the attribute cell at an intersection of the requisite axes, a user of an application device can enter preferences directly in the application device for storage in a session preference memory. If the user does not desire to enter preferences at such time, the preferences can be established by an establishment procedure. After the preferences are established by the establishment procedure, the user of the application device can refine the established preferences to newly selected user preferences or can defer refinement and selection of preferences to a later time.

The establishment procedure establishes the preferences in one embodiment by assigning default preferences. Typically the default preferences are stored for a typical user in a typical environment in each application used on an application device. Alternatively in another embodiment, the establishment procedure can establish preferences by a prediction procedure. When certain preferences are needed in an application device and are either unavailable or unacceptable, preferences can be established and stored in the session preference memory of the application device by providing them directly from the preference selection matrix 805 by a prediction process. The prediction procedure can predict preferences by access to the next best preferences stored in adjacent attribute cells of the preference selection matrix. The preferences can also be accurately determined using artificial intelligence. Thus, the multi-dimensional structure of a preference memory can be provided by artificial intelligence using knowledge-bases and networks. For example, fuzzy logic can be used to predict the preferences using such a memory. Furthermore the preferences can be predicted by a neutral network used to learn a users preferences for various application devices, environments and the like. Such neutral network could predict a users preferences for attributes needed given such new application devices or environments.

The prediction procedure can be performed either in the application device or in the donor device. In the application device the prediction procedure can be performed based on the preferences presently contained in the application device for a user, such as those preferences in the session preference memory, or based on the preferences in a reference preference e memory of a donor device. In a donor device the prediction procedure can be performed based on the preferences for a user stored in a reference preference memory. For an optimal prediction process to be performed in the application device, the application device would preferably need access to the largest available amount of preference data from a user's reference preference set. The largest available preference data is stored in a reference preference memory of a donor device. Such transfer of an entire user's reference preference set from a reference preference memory of a donor device to an application device might be cumbersome on a network or might consume an unreasonable amount of memory in the application device. In such instances, the prediction can be performed by a donor device having a processor associated with the reference preference memory. The prediction process, whether performed in the application device or the donor device, could interpolate or scale between nearby associated preferences in a matrix. For example, font sizes selected for the screen of a personal computer would be larger than font sizes selected for the screen of a cellular telephone, because the personal computer has a larger size screen that the cellular telephone. A pocket organizer's screen size would probably be in between the two, but could not have an established preference for font sizes. Thus the selection or prediction algorithm can be used to scale an appropriate distance between the personal computer font size and the cellular phone font size in order to propose a font size for the screen size of the pocket organizer.

Figure 12:
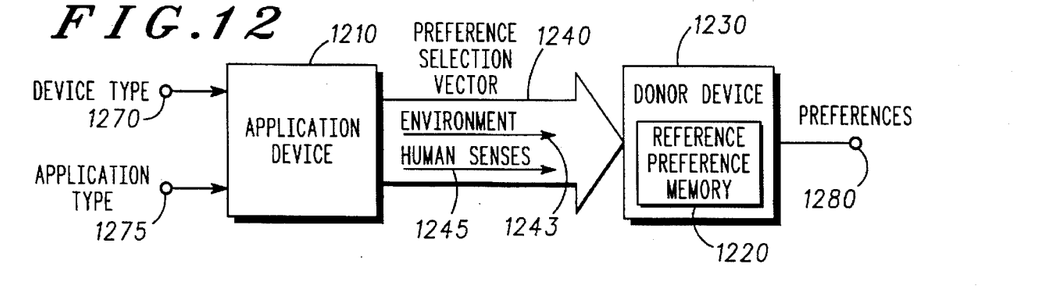
FIG. 12 illustrates a block diagram showing information transfer among an application device and a donor device according to the present invention.

FIG. 12 illustrates a block diagram showing information transfer among an application device 1210 and a donor device 1230 according to the present invention. A preference selection vector 1240 is sent from the application device 1210 to the donor device 1230 to access one or more preferences 1280 from a reference preference memory 1220. The preference selection vector 1240 is derived by the application device 1210 based on the situation such as, for example, the application device type 1270 and the application type 1275 being used. The device type 1270 and application type 1275 are preferably determined by the application device using a computer circuit internal thereto. The preference selection vector 1240 thus can represent axes of access of characteristics of the needed attributes. For example, an environment code 1242 and a human senses code 1245 indicative of the needed attributes can be used for a preference selection vector 1240, expressed as <environment, human senses>. The preference selection vector 1240 can be further defined by the type of needed attributes such as visual and audible human preferences, expressed as <environment, <visual, audible>>.

Preferably the preference selection vector does not contain a user code for the particular user using an application device. This is because some donor devices, such as smart cards, for example, are preferably specific to a single user. In such an instance, user information does not need to be sent to the smart card because the card provides preference information for only one user. In instances where a card or other donor device can provide preferences for more than one user, besides the vector, information indicative of a user such as a user code must be sent to access a donor device. Thus, for a donor device that serves multiple users, user information besides the preference selection vector is sent to the donor device.

Figure 13:
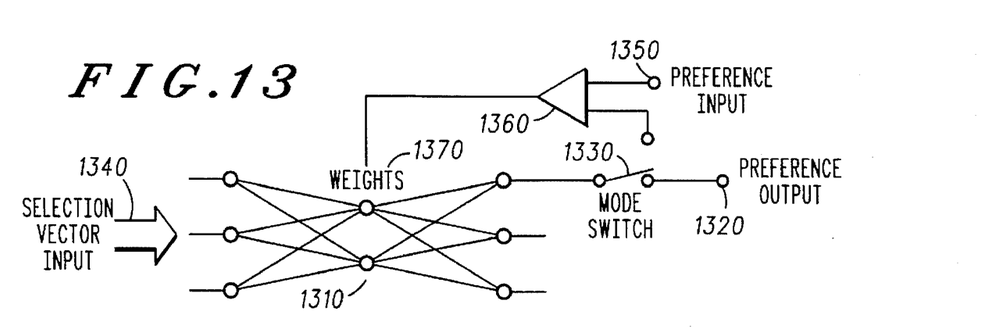
FIG. 13 illustrates an apparatus for storing and predicting preferences according to an embodiment of the present invention.

FIG. 13 illustrates an apparatus for storing and predicting preferences according to an embodiment of the present invention. A layered neural network 1310 serves both as a memory to store preferences and as a processor to predict preferences. The neural network 1310 operates to provide predicted preferences 1320 in relation to a preference selection vector 1340 when a mode switch 1330 is in the down position. When the mode switch 1330 is in the up position, the neural network 1310 operates to learn or store input preferences 1350 in relation to a preference selection vector 1340. The neural network 1310 learns or stores based on weight values 1370 imparted on individual nodes of the layers. A weight error algorithm, illustrated simply by a comparator 1360, provides the weights based on a difference between outputs of the neural network and the preference input 1350 for an associated preference selection vector input 1340.

Figure 14:
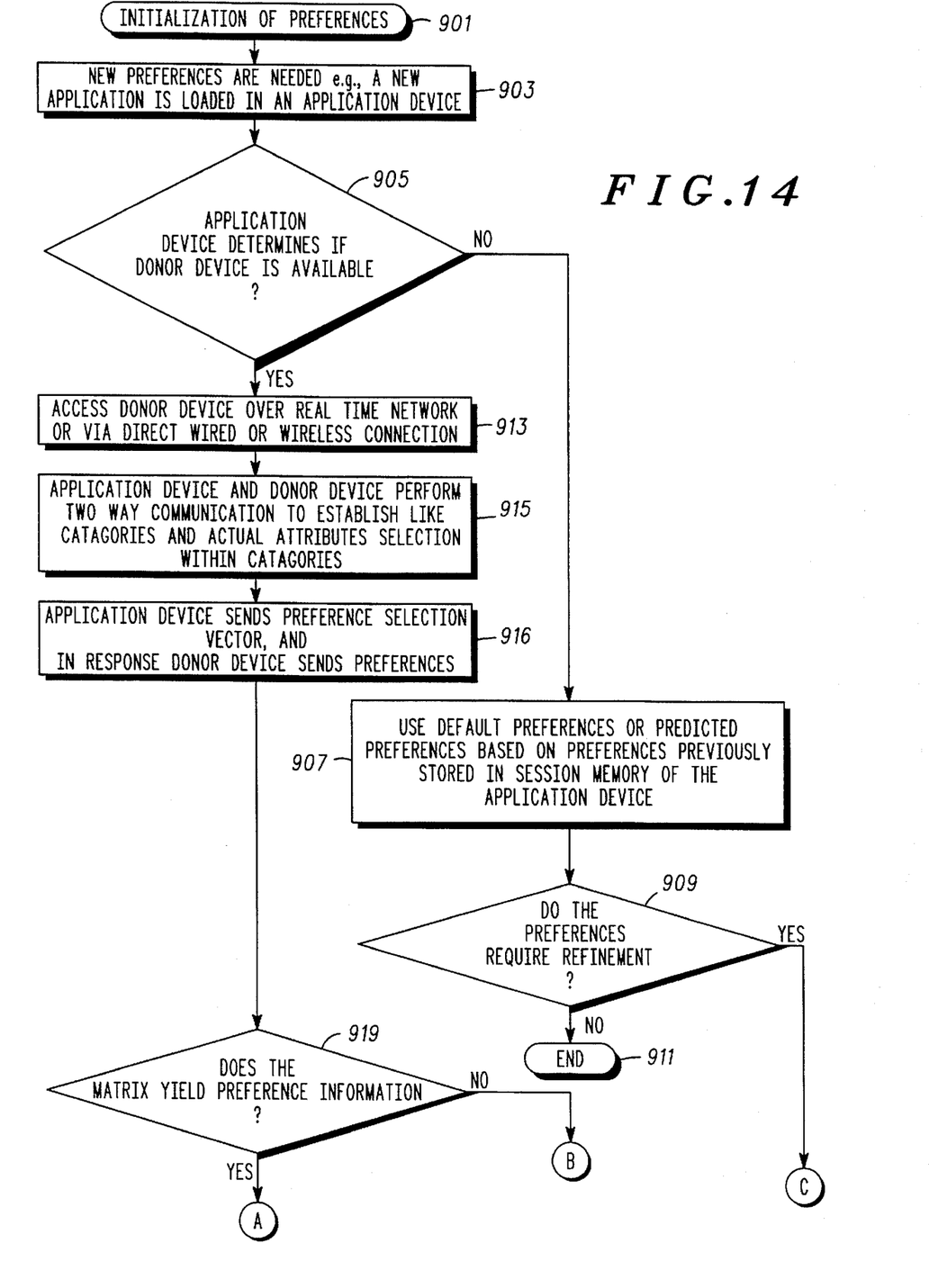
FIGS. 14–16 illustrate a flow chart realizing a method for obtaining preferences when new preferences are needed according to the present invention.
Figure 15:
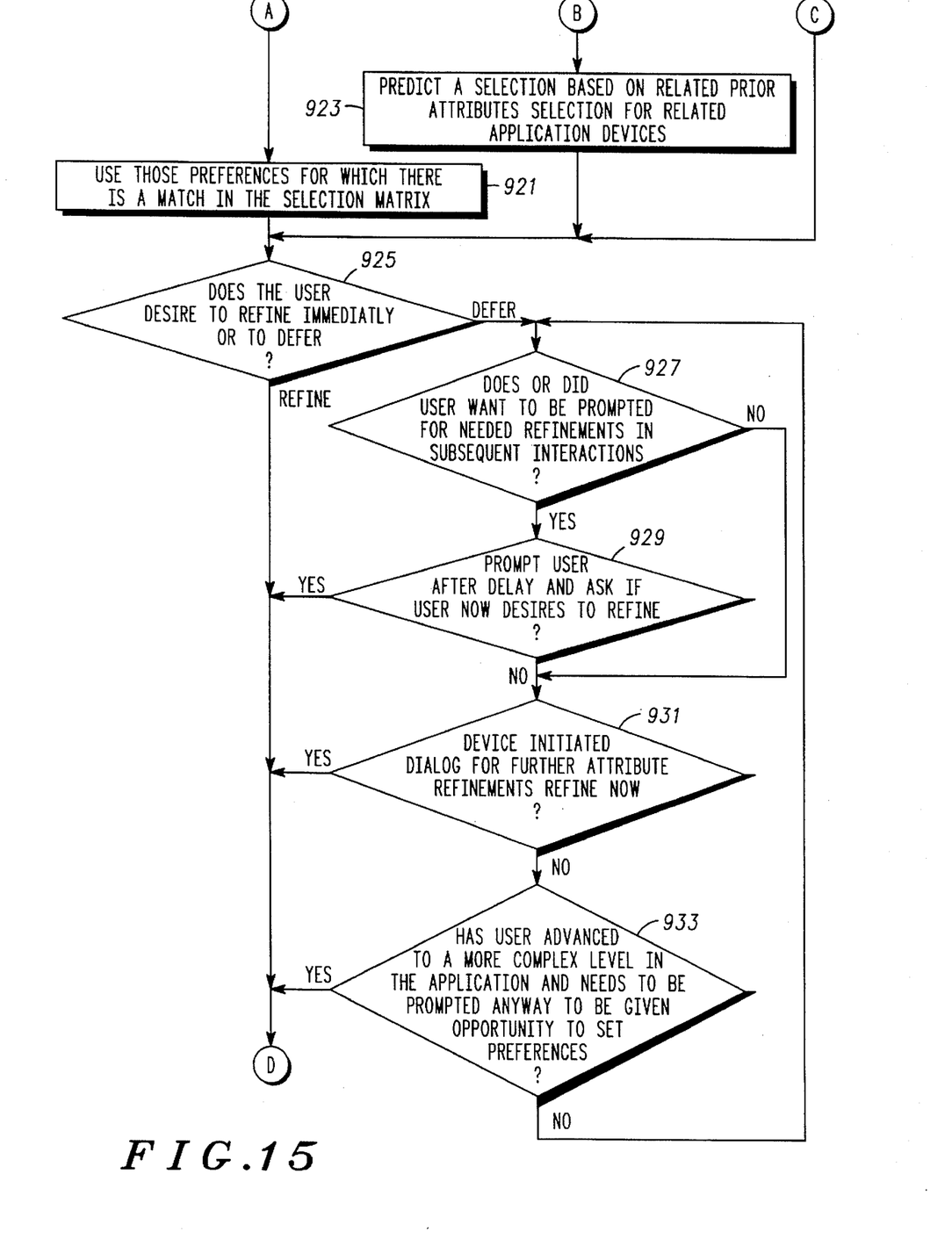
Figure 16:
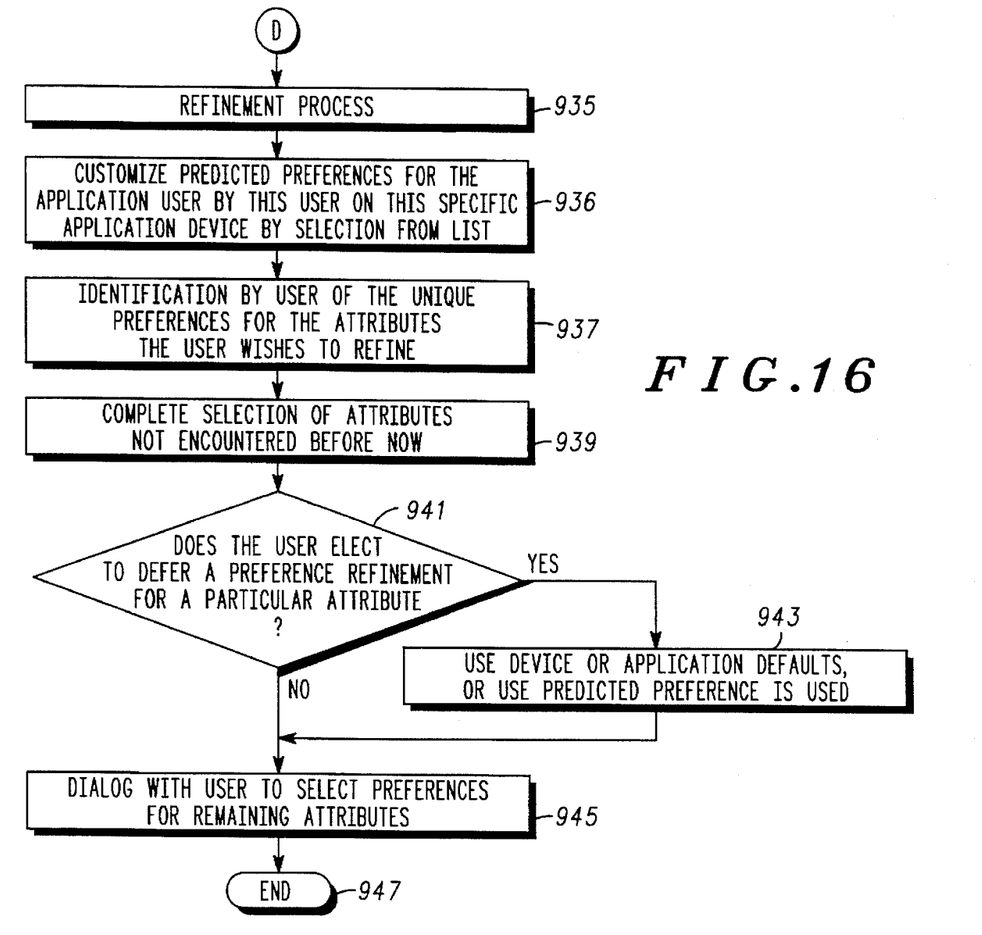

FIGS. 14–16 illustrate a flow chart for the initialization of preferences when new preferences need to be set-up. The method is called at block 901 when preferences need to be initialized. For example, preferences will need to be set-up when a new application is loaded into a new application device in block 903. When new preferences are needed in an application device, the application device first determines if the donor device is available in block 905. If the donor device is not available, flow proceeds to block 907. If this available, flow proceeds to block 913.

The application device can also determine if this is the first time the application has been used by this user by checking information stored in the application device. Storage of such information in the application device could consume too much memory, and thus the application device and donor device would need to communicate with one another to determine if this is the first time the application has been used by this user.

When this application has previously been used by this user, in block 907, the default preferences or predicted preferences based on preferences previously stored are used by the application device. These preferences are obtained from the session preference memory of the application device or the user's reference preference set stored in the reference preference memory of the donor device.

Because all other application devices will not require exactly the same preferences for the application as selected by the user for a previous application device, flow proceeds to block 909 where it is determined if the preferences require refinement. If the preferences do not require refinement, the session ends at block 911. If refinement is required, flow proceeds to block 925 where the user chooses whether or not to immediately refine or defer refinement.

When preferences have not been set for this application for this user, flow proceeds from block 905 to block 913. At block 913, the donor device is accessed. Access to the donor device can occur over a real time network, via a wireless connection or directly by cable, radio frequency, infrared, for example. The application device and donor device then perform two-way communication to establish like categories and actual attribute selection within the categories in block 915. A majority of the attributes are then identified or predicted using various of the techniques discussed above. Preferably, the reference selection matrix is used to yield the preference information.

The application device sends to the donor device in block 916 the preference selection vector containing, for example, a human senses code indicative of needed human senses attributes, an environment code indicative of the environment desired for the needed attributes and an application device code indicative of the particular application device used. When the accessed donor device is of a type capable of storing preferences for multiple users, a user code indicative of the user of the application device can also be sent together with the preference selection vector.

The donor device then receives the preference selection vector and any user code over the real time network or direct wired or wireless link. A pertinent reference preference memory is selected by the donor device based an any received user code. In response to the preference selection vector, the donor device then obtains or determines the preferences by, for example, prediction. Those preferences determined by the donor device are then sent back in block 916 to the application device over the real time network or direct wired or wireless link. By engaging in this two-way communication, the application device does not need to contain the entire reference preference memory of the donor device. The donor device then can be accessed using information indicative of the multiple axes of access to, for example, the preference selection matrix. Without the two-way communication process of forwarding the information, the entire reference preference matrix would need to be loaded into the memory of the device so that the application device itself could determine or predict the preferences. Thus, loading an entire reference preference memory into an application device is possible when the two-way communication is avoided.

Block 919 determines whether the reference selection matrix yielded the necessary preference information. If the reference preference matrix did not yield the necessary preference information, flow proceeds to block 923 where a selection is predicted based on related prior attribute selections for related application devices using prediction techniques discussed above. If the reference selection matrix does yield preference information, then those preferences for which there is a match in the matrix are used at block 921. Thereafter, refinement is preferable by the user.

Block 925 allows the user to define whether the user wishes to refine immediately or to defer refinement. If the user elects to defer refinement, the user is given the choice whether or not to be prompted for needed refinements in subsequent interactions at block 927. Such prompts can be provided after periodic time delays where the user is asked if the user now desires to refine. If the user wants to be prompted for needed refinements, the user is prompted upon a particular event such as the next time the user signs on to the application or such as after a time delay. After an event such as a time delay, the user is asked in block 929 if the user now desires to refine. If the user now desires to refine, flow proceeds to the refinement process beginning at block 935. However, if the user, after prompting, does not want to refine now, flow proceeds to block 931. At block 931, the user is prompted by the device upon events such as restarting a new application. In block 933, the user is prompted to refine when advancing to a more complex level in the application. If in blocks 931 or 933 the user elects to refine, flow proceeds to the refinement process beginning at block 935. However, if the user decides not to refine after block 931 or 933, flow loops back to block 927.

The refinement process allows the user to customize predicted preferences for the application used by the user on this specific application device as summarized in block 936, and allows the user to identify unique preferences for the attributes the user wishes to refine as summarized in block 937. The user can also complete a selection a of attributes not encountered before now, as summarized in block 939. Such customization or selection can be from a list of choices determined based on user historical data, such as the information received from a donor device. The chosen preferably represents various predicted preferences ranked in likelihood of correctness by the prediction process. In the refinement process, the user is first asked whether the user wishes to defer a preference refinement for any particular attributes in block 941. If the user elects to defer refinement for some particular attributes, flow proceeds through block 943 to block 945. At block 943, those attributes elected to be deferred from this refinement process are assigned preferences using the device or application defaults, or predicted preferences. Those preferences the user does elect to refine are then selected for the remaining attributes in block 945 and the session ended at block 947.

The flowchart of FIGS. 14–16 can also be used to initially set-up the personal attribute selection and management system for a new user. The new user, beginning at block 901, would immediately need to perform the refinement procedure beginning at block 935. Thereafter, the selected preferences would be stored for the appropriate attributes in the donor device.

Figure 17:
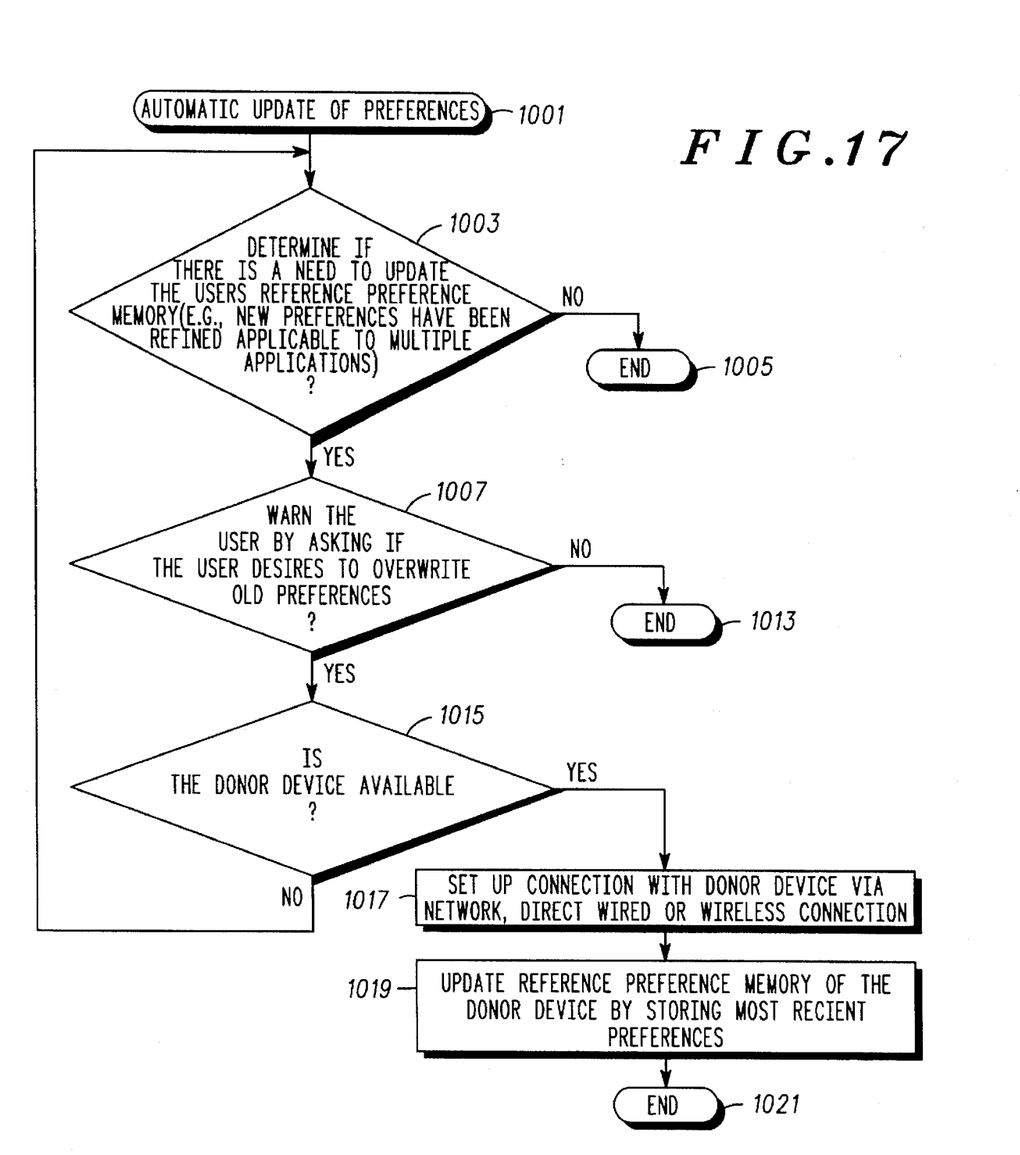
FIG. 17 illustrates a flow chart for updating preferences according to the present invention.

FIG. 17 illustrates a flow chart for the automatic updating of preferences beginning at block 1001. In block 1003, either the application device or the donor device determines if there is a need to update the user's reference preference memory. Such a need can occur, for example, when new preferences have been refined applicable to multiple applications. In such an instance, these new preferences need to be stored in the user's reference preference memory. If no preferences need to be updated, the session ends at block 1005. Block 1007 warns the user by asking if the user desires to overwrite old preferences. If the user desires to abort overwriting of old preferences the session ends at block 1013. If the user authorizes overwriting old preferences, block 1015 determines if the donor device is available, e.g., a real time connection is currently available. If such device is available, flow would proceed to block 1017 where a connection is set up with the donor device via a network, direct wired or wireless connection. However, if access to another device is not available, the update is effectively deferred by feedback from block 1015 to block 1003. After the connection is set up with the donor device via direct wired or direct wireless connection, the reference preference memory device is updated in block 1019 by storing the most recent time-stamped preferences and the session ending at block 1021.

Figure 18:
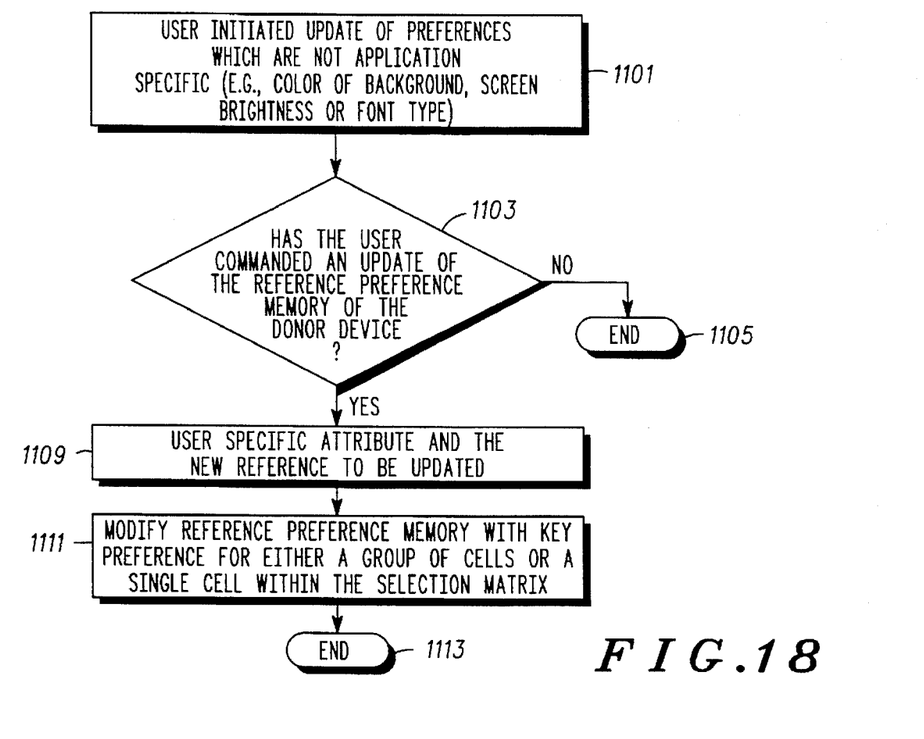
FIG. 18 illustrates a flow chart for user initiation of the update of non-application specific preferences.

FIG. 18 illustrates a flow chart for user initiated updating of preferences which are not application specific. The method begins at block 1101 where not application specific preferences such as color or the background of a display or the font type on a display can be updated. A user might use this update procedure when the user obtains new eye glasses and desires to adjust visual characteristics for all instances regardless of application or application device. Such an update occurs when the user has commanded an update of the reference preference memory of the donor device as determined in block 1103. If the user has not commanded such an update, the session is ended at block 1105. Otherwise, the user specified attribute and new reference to be updated is set in block 1109. Thereafter, the reference preference memory is modified with key preference for either a group of attribute cells or a single attribute cell within a selection matrix in block 1111 and the session ended at block 1113.

Although the invention has been described and illustrated in the above description and drawings, it is understood that this description is by example only and that numerous changes and modifications can be made by those skilled in the art without departing from the true spirit and scope of the invention. Therefore, various user's reference preference sets can be stored in different locations depending upon convenience and availability of donor devices.

What is claimed is:

1. An application device capable of a preference set-up, said application device comprising:

a port for coupling with a donor device having preferences; and a controller operatively coupled to said port to access the donor device via the port to interrogate the donor device by sending a preference selection vector to the donor device identifying at least an environment of use and an application device type and to receive at least human senses preferences from the donor device in response to the preference selection vector.

2. An application device according to claim 1, wherein said controller is operatively coupled to said port to access the donor device via the port to interrogate the donor device by sending the preference selection vector identifying at least an application device type, an environment of use and requested categories of human senses and to receive at least human senses preferences from the donor device in response.

3. An application device according to claim 1, wherein said controller is operatively coupled to said port to access the donor device via the port to interrogate the donor device by sending the preference selection vector identifying at least an environment of use and an application device type and an application used on the application device and to receive from the donor device in response.

4. An application device according to claim 1, wherein said controller is operatively coupled to said port to access the donor device via the port to provide to the donor device the preference selection vector of at least three dimensions.

5. An application device according to claim 1,
wherein said application device further comprises a session preference memory operatively coupled to said controller; and
wherein said controller is operatively connected to said session preference memory to predict preferences using a prediction procedure and to store predicted preferences in said session preference memory.

6. An application device according to claim 5,
wherein said controller determines if a donor device is available when new preferences need to be set-up;
wherein said controller connects to the donor device when said controller determines the donor device is available when the new preferences need to be set up and; and
wherein said controller performs the prediction procedure to temporarily assign predicted preferences when said controller determines the donor device is unavailable when the new preferences need to be set up.

7. An application device according to claim 5,
wherein said application device comprises a user interface device; and
wherein said controller is operatively coupled to said user interface device to refine the predicted preferences through user interaction with said user interface device to produce refined user preferences.

8. An application device according to claim 1,
wherein said port couples with the donor device having preferences for a plurality of users; and
wherein said controller is operatively coupled to said port to access the donor device via the port to provide to the donor device the preference selection vector comprising information identifying of a user of the application device and to receive from the donor device in response thereto specific preferences.

9. An application device according to claim 8, wherein said port couples to said donor device by a wireless connection.

10. An application device according to claim 9, wherein said port couples by the wireless connection including an optical link.

11. An application device according to claim 9, wherein said port couples by the wireless connection including a radio link.

12. An application device according to claim 8, wherein said port couples to said donor device over a network.

13. An application device according to claim 1,
wherein said port couples with the donor device having preferences for one user; and
wherein said controller is operatively coupled to said port to access the donor device via the port to provide to the donor device the preference selection vector and to receive from the donor device in response thereto specific preferences that pertain to the one user.

14. An application device according to claim 13, wherein said donor device comprises a card unique to the user.

15. An application device according to claim 1,
wherein said controller determines if at least one of a donor device or another application device serving as an attached donor device is available; and
wherein, when said controller determines at least one of the devices is available, said controller connects to the devices to reconcile preferences by exchanging and storing the most recent preferences.

16. An application device according to claim 1, wherein said application device comprises a radio telephone.

17. An application device according to claim 16, wherein said application device comprises a preference memory.

18. An application device according to claim 16, wherein said preference memory comprises a card unique to the user.

19. A donor device capable of setting-up preferences for an application device, said donor device comprising:
a port for coupling to an application device to receive a preference selection vector from the application device identifying at least an environment of use and an application device; and
a reference preference memory with a multi-dimensional structure and having preferences stored therein and operatively coupled to said port to be interrogated by the preference selection vector and to provide to the application device at least specific human preferences that pertain to the preference selection vector.

20. A donor device according to claim 19, wherein said reference preference memory is operatively coupled to said port to access the application device via the port to receive from the application device the preference selection vector identifying at least an environment of use, an application device and requested categories of human senses and provide to the donor device in response thereto at least specific human preferences that pertain thereto.

21. A donor device according to claim 19, wherein said reference preference memory is operatively coupled to said port to access the application device via the port to receive from the application device the preference selection vector identifying at least an environment of use and an application device and an application used on the application device and to provide to the application device in response thereto at least specific human preferences that pertain thereto.

22. A donor device according to claim 19, wherein said reference preference memory is operatively coupled to said port to receive, from the application device and access the reference preference memory thereby, the preference selection vector of at least three dimensions.

23. A donor device according to claim 19, further comprising a controller operatively coupled to said port and said reference preference memory to perform a prediction procedure and send predicted preferences via said port to an application device when said reference preference memory has unavailable preferences.

24. A donor device according to claim 19,
wherein said reference preference memory has preferences stored therein for a plurality of users; and
wherein said port couples with the application device to receive the preference selection vector comprising information identifying of a user of the application device and to provide from said reference preference memory in response thereto specific preferences that pertain to the user.

25. A donor device according to claim 24, wherein said port couples to said application device by a wireless connection.

26. A donor device according to claim 24, wherein said port couples to said application device over a network.

27. A donor device according to claim 19,
wherein said reference preference memory has preferences stored therein for one user; and
wherein said port couples with the application device to receive the preference selection vector for the one user and to provide from said reference preference memory in response thereto specific preferences that pertain to the one user.

28. A donor device according to claim 27, wherein said donor device comprises a card unique to the user.

29. A donor device according to claim 28, wherein said card comprises a memory and a processor.

30. A method of setting-up preferences, said method comprising the steps of:
(a) coupling an application device requiring a preference set-up and a donor device having preferences;
(b) accessing the donor device having preferences stored therein;
(c) interrogating the donor device by sending a preference selection vector to the donor device identifying at least an environment of use and an application device type; and
(d) receiving at least human senses preferences from the donor device in response to the preference selection vector.

31. A method according to claim 30,
wherein said step (c) of interrogating sends to the donor device the preference selection vector identifying at least the environment of use, an application device type and requested categories of human senses; and
wherein said step (d) of receiving at least human senses preferences receives from the donor device in response thereto specific preferences that pertain thereto.

32. A method according to claim 30,
wherein said step (c) of interrogating sends to the donor device the preference selection vector identifying at least the environment of use, the application device type and an application used on the application device; and
wherein said step (d) of receiving at least human senses preferences receives from the donor device in response thereto specific preferences that pertain thereto.

33. A method according to claim 30, wherein said step (c) of interrogating sender the preference selection vector of at least three dimensions.

34. A method according to claim 30, further comprising the step of (e) predicting preferences based on preferences received from a donor device using a prediction procedure.

35. A method according to claim 34, further comprising the step of (f) refining the predicted preferences through user interaction with a user interface device to produce refined user preferences.

36. A method device according to claim 30,
wherein said method further comprises the steps of
(e) determining if a donor device is available when new preferences need to be set-up; and
(f) performing a prediction procedure to temporarily assign predicted preferences when the donor device is unavailable when the new preferences need to be set up; and
wherein said step (a) of coupling comprises the substep of
(a1) coupling an application device and a donor device when the donor device is available.

37. A method according to claim 30, wherein said step (a) of coupling comprises the substep of (a1) coupling the application device and the donor device over a network.

38. A method according to claim 30, wherein said step (a) of coupling comprises the substep of (a1) coupling the application device and the donor device by a wireless connection.

39. A method according to claim 30, wherein said step (a) of coupling comprises the substep of (a1) coupling the application device to a donor device comprising a card unique to the particular user.

40. A method of setting-up preferences, said method comprising the steps of:
(a) coupling an application device requiring a preference set-up and a donor device having preferences;
(b) accessing the application device;
(c) receiving from the application device a preference selection vector for interrogation identifying at least an environment of use and an application device type; and
(d) accessing a reference preference memory using the preference selection vector and transmitting at least human senses preferences to the application device that pertain to the preference selection vector.

41. A method according to claim 40,
wherein said step (c) of receiving receives the preference selection vector identifying at least the environment of use, an application device type, and requested categories of human senses; and
wherein said step (d) of transmitting transmits at least human senses preferences to the application device in response.

42. A method according to claim 40,
wherein said step (c) of receiving receives from the application device the preference selection vector identifying at least an environment of use, an application device type, and an application used on the application device; and
wherein said step (d) of transmitting transmits at least human senses preferences to the application device in response.

43. A method according to claim 40, wherein said steps (c) and (d) of receiving and accessing receives the preference selection vector of at least three dimensions and accesses the reference preference memory using the at least three dimensions of the preference selection vector.

44. A method according to claim 40, further comprising the step of (e) performing a prediction procedure and transmitting predicted preferences to an application device when said donor device has unavailable preferences.

* * * * *